(12) United States Patent
Chen et al.

(10) Patent No.: US 11,616,631 B2
(45) Date of Patent: *Mar. 28, 2023

(54) INTEGRATED CIRCUIT WITH RADIO FREQUENCY INTERCONNECT

(71) Applicant: TAIWAN SEMICONDUCTOR MANUFACTURING COMPANY, LTD., Hsinchu (TW)

(72) Inventors: Huan-Neng Chen, Taichung (TW); William Wu Shen, Hsinchu (TW); Chewn-Pu Jou, Hsinchu (TW); Feng Wei Kuo, Zhudong Township (TW); Lan-Chou Cho, Hsinchu (TW); Tze-Chiang Huang, Saratoga, CA (US); Jack Liu, Taipei (TW); Yun-Han Lee, Baoshan Township (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 99 days.

This patent is subject to a terminal disclaimer.

(21) Appl. No.: 15/931,273

(22) Filed: May 13, 2020

(65) Prior Publication Data

US 2020/0274685 A1 Aug. 27, 2020

Related U.S. Application Data

(63) Continuation of application No. 14/921,205, filed on Oct. 23, 2015, now Pat. No. 10,673,603.

(51) Int. Cl.
*H04J 3/00* (2006.01)
*H04L 5/14* (2006.01)
*H04W 52/02* (2009.01)

(52) U.S. Cl.
CPC ............ *H04L 5/14* (2013.01); *H04W 52/0261* (2013.01); *Y02D 30/70* (2020.08)

(58) Field of Classification Search
CPC ...... H04L 5/14; H04W 52/0261; Y02D 30/70; H04B 1/0067; H04B 1/401
USPC ........................................................ 370/280
See application file for complete search history.

(56) References Cited

U.S. PATENT DOCUMENTS

| | | |
|---|---|---|
| 8,270,316 B1 | 9/2012 | Chang |
| 8,279,008 B2 | 10/2012 | Hsieh et al. |
| 8,427,240 B2 | 4/2013 | Hsieh et al. |
| 8,593,206 B2 | 11/2013 | Chen et al. |
| 8,610,494 B1 | 12/2013 | Jin et al. |
| 8,618,631 B2 | 12/2013 | Jin et al. |
| 8,718,054 B2 | 5/2014 | Yousefi |

(Continued)

*Primary Examiner* — Chuong T Ho
(74) *Attorney, Agent, or Firm* — Hauptman Ham, LLP

(57) ABSTRACT

An integrated circuit includes a first through fourth devices positioned over a substrate, the first device including first through third transceivers, the second device including a fourth transceiver, the third device including a fifth transceiver, and the fourth device including a sixth transceiver. A first radio frequency interconnect (RFI) includes the first transceiver coupled to the fourth transceiver through a first guided transmission medium, a second RFI includes the second transceiver coupled to the fifth transceiver through a second guided transmission medium, and a third RFI includes the third transceiver coupled to the sixth transceiver by the second guided transmission medium.

20 Claims, 10 Drawing Sheets

(56) References Cited

U.S. PATENT DOCUMENTS

| | | | |
|---|---|---|---|
| 2004/0252755 A1 | 12/2004 | Jaffe | |
| 2006/0083321 A1 | 4/2006 | Sedarat | |
| 2006/0256964 A1* | 11/2006 | Gu | H04L 27/02 |
| | | | 380/242 |
| 2008/0089692 A1* | 4/2008 | Sorin | H04J 14/02 |
| | | | 398/135 |
| 2009/0285135 A1 | 11/2009 | Rousu | |
| 2010/0022204 A1* | 1/2010 | Rofougaran | H01P 1/20372 |
| | | | 455/90.2 |
| 2010/0104056 A1* | 4/2010 | Taich | H04L 7/0083 |
| | | | 375/359 |
| 2010/0165892 A1 | 7/2010 | Cha | |
| 2010/0257391 A1* | 10/2010 | Dring | G06F 1/3209 |
| | | | 713/323 |
| 2012/0082194 A1* | 4/2012 | Tam | H04B 5/0031 |
| | | | 375/219 |
| 2012/0092230 A1 | 4/2012 | Hung et al. | |
| 2013/0023214 A1 | 1/2013 | Wang | |
| 2013/0039315 A1 | 2/2013 | Jo | |
| 2013/0215935 A1* | 8/2013 | Nuzman | H04B 3/32 |
| | | | 375/219 |
| 2013/0215951 A1* | 8/2013 | Nuzman | H04B 3/487 |
| | | | 375/227 |
| 2013/0234305 A1 | 9/2013 | Lin et al. | |
| 2014/0132333 A1 | 5/2014 | Jin et al. | |
| 2014/0217546 A1 | 8/2014 | Yen et al. | |
| 2014/0253262 A1 | 9/2014 | Hsieh et al. | |
| 2014/0253391 A1 | 9/2014 | Yen | |
| 2015/0155891 A1* | 6/2015 | Soliman | H04L 27/2626 |
| | | | 455/552.1 |
| 2015/0215105 A1 | 7/2015 | Velitheri | |
| 2017/0033834 A1* | 2/2017 | Gross | H04B 3/52 |

* cited by examiner

INTEGRATED CIRCUIT WITH RADIO FREQUENCY INTERCONNECT

PRIORITY CLAIM

The present application is a continuation of U.S. application Ser. No. 14/921,205, filed Oct. 23, 2015, which is incorporated herein by reference in its entirety.

BACKGROUND

In a packaged integrated circuit, there are many individual devices such as a memory, an analog-to-digital converter, wireless communication devices, an application processor, and so forth. The individual devices often communicate with each other by a bus such as Serial Peripheral Interface (SPI) or Inter-Integrated Circuit ($I^2C$). Alternatively, some devices communicate by a radio frequency interconnect (RFI).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
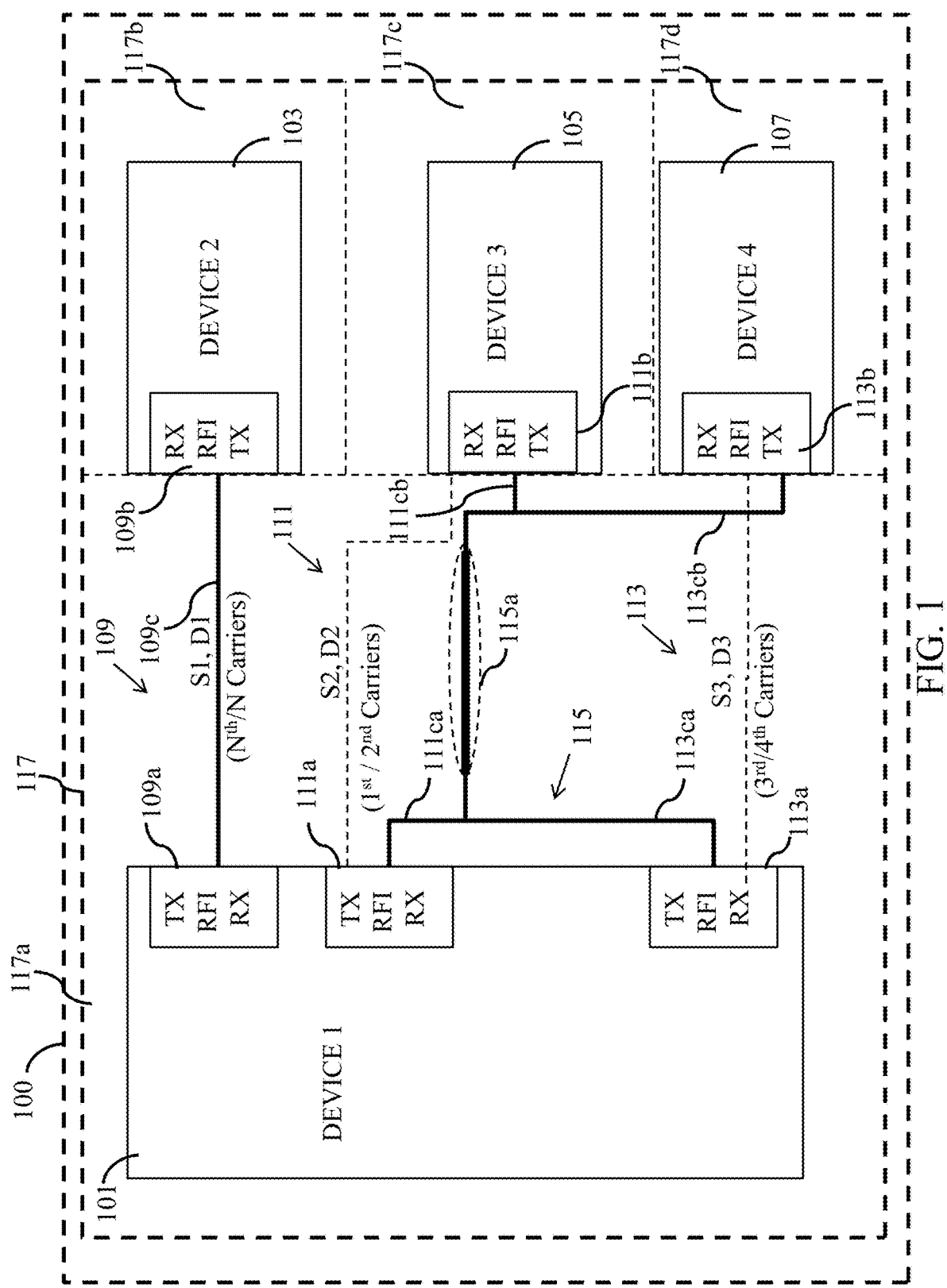
FIG. 1 is a block diagram of an integrated circuit having a radio frequency interconnect, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Radio frequency interconnects (RFI's) are usable in integrated circuits that are packaged by a 2D, a 2.5D, or a 3D packaging technique. Compared to other types of interconnection techniques, such as coupling components of an integrated circuit by a bus, RFI's help to conserve space by reducing a number of electrical interconnects used to couple the components with one another. Accordingly, an integrated circuit having the features described in the discussed embodiments is capable of being physically smaller in size compared to an integrated circuit that includes components connected by other interconnection techniques. Compared to other types of interconnection techniques, such as coupling components of an integrated circuit by a bus, RFI's help to reduce power consumption because of the reduced number of electrical interconnects used to couple the components with one another. Accordingly, an integrated circuit having the features described in the discussed embodiments is capable of consuming a lesser amount of power compared to an integrated circuit that includes components connected by other interconnection techniques.

An RFI, as discussed herein, connects individual components of an integrated circuit by a transmission line or channel. In some embodiments, an RFI connects individual components of an integrated circuit by a single-ended transmission line. In some embodiments, a single device using a large bandwidth and/or being associated with having a high data transfer rate, e.g., a memory, is coupled to a processor by an RFI having a transmission line. In some embodiments, two or more devices that use a lower bandwidth and/or are associated with a lower data transfer rate compared to a larger-bandwidth device are coupled to the processor by an RFI having a transmission line. In some embodiments, the transmission line includes two conductive lines suitable to transmit a signal in a differential mode. In some embodiments, the transmission line is a coplanar waveguide.

FIG. 1 is a block diagram of an integrated circuit 100 having an RFI, in accordance with one or more embodiments. Integrated circuit 100 comprises a first device 101 communicatively coupled with a second device 103, a third device 105 and a fourth device 107.

First device 101 is coupled with second device 103 by a first RFI 109 comprising a transceiver 109a, a transceiver 109b, and a first channel 109c. One of the first device 101 or second device 103 is configured to transmit or receive a first signal S1 to the other of the first device 101 or second device 103 by first channel 109. In some embodiments, first channel 109c includes a differential transmission line, a single-ended transmission line or a waveguide. First signal S1 includes data, signaling or command information.

First device 101 is coupled with third device 105 by a second RFI 111 comprising a transceiver 111a, a transceiver 111b, and a second channel 115. One of the first device 101 or third device 105 is configured to transmit or receive a second signal S2 to the other of the first device 101 or third device 105 by second channel 115. Second signal S2 includes data, signaling or command information.

First device 101 is also coupled with fourth device 107 by a third RFI 113 comprising a transceiver 113a, a transceiver 113b, and second channel 115. Second RFI 111 and third RFI 113 are configured to share second channel 115. One of the first device 101 or fourth device 107 is configured to transmit or receive a third signal S3 to the other of the first device 101 or fourth device 107 by second channel 115. Third signal S3 includes data, signaling or command information.

Second channel 115 includes a first channel portion 111ca/111cb (collectively referred to herein as channel portion 111c), a second channel portion 113ca/113cb (collectively referred to herein as second channel portion 113) and a central channel portion 115a. In some embodiments, second channel 115 includes a differential transmission line, a single-ended transmission line or a waveguide. In some embodiments, at least one of first channel portion 111c, second channel portion 113c or central channel portion 115a includes a differential transmission line, a single-ended transmission line or a waveguide.

Second channel 115 is a channel usable by each of second RFI 111 and third RFI 113. Because at least the second RFI 111 and the third RFI 113 share second channel 115, integrated circuit 100 is capable of physically occupying a smaller amount of space than if integrated circuit 100 included an entirely separate channel for each individual RFI included therein.

First signal S1 has a first data rate D1, second signal S2 has a second date rate D2 or third signal S3 has a third data rate D3. First data rate D1, second date rate D2 or third data rate D3 are associated with the corresponding second device 103, the third device 105, or the fourth device 107. In some embodiments, second data rate D2 is different from first data rate D1. In some embodiments, third data rate D3 is different from the first data rate D1.

In some embodiments, the first device 101, the second device 103, the third device 105 and the fourth device 107 are positioned over a single substrate 117. In some embodiments, one or more of the first device 101, the second device 103, the third device 105 or the fourth device 107 are over one or more of separate substrates 117a-117d. In some embodiments, at least one of first device 101, second device 103, third device 105 or fourth device 107 comprise at least one of a memory device, a wireless communication device, e.g., a Bluetooth® module, a Zigbee® module, an IEEE 802.11 wireless networking module, or another suitable wireless communication device, an analog-to-digital converter, a digital-to-analog converter, a sensor module, a discrete application processor for performing operations in a low power state, a hardware processor, a memory controller, or another suitable device.

In some embodiments, first device 101 is a processor. In some embodiments, second device 103, third device 105, and fourth device 107 are, for example, the same or different devices configured to support different data rates compared to one another. In some embodiments, first RFI 109 is configured to support a data rate greater than second RFI 111 or third RFI 113. Second RFI 111 is configured to support a data rate that is less than, equal to or greater than third RFI 113. In some embodiments, first RFI 109 is configured to support a data rate that is greater than about 6.93 Gbps, second RFI 111 is configured to support a data rate that is less than about 54 Mbps, and third RFI 113 is configured to support a data rate that is greater than about 54 Mbps and less than about 6.93 Gbps. The aforementioned values and ranges of the supported data rates are examples to demonstrate the differences in capabilities of the first RFI 109, second RFI 111 and third RFI 113 for ease of discussion, and in no way restrict the integrated circuit 100 from including one or more RFIs or devices configured to support different data rates.

The transceivers 109a, 109b of the first RFI 109 are included as transceiver pairs in the first device 101 and the second device 103. The transceivers 111a, 111b of the second RFI 111 are included as transceiver pairs in the first device 101 and the third device 105. The transceivers 113a, 113b of the third RFI 113 are included as transceiver pairs in the first device 101 and the fourth device 107. In some embodiments, the transceivers of the first RFI 109, the second RFI 111 and the third RFI 113 are communicatively coupled with the first device 101, the second device 103, the third device 105 and the fourth device 107.

In some embodiments, one or more of the transceivers (e.g., transceivers 109a, 109b 111a, 111b, 113a or 113b) of the first RFI 109, the second RFI 111 or the third RFI 113 are configured to be transmitters or receivers. If, for example, the integrated circuit 100 is configured such that the first RFI 109, the second RFI 111 and the third RFI 113 are configured to facilitate uni-directional communications, then in such an embodiment, the transceivers 109a, 111a, 113a included in the first device 101 are configured as transmitters and the transceivers 109b, 111b, 113b included in the corresponding second device 103, the third device 105 and the fourth device 107 are configured as receivers. In some embodiments, one or more of the first RFI 109, the second RFI 111 or the third RFI 113 are configured to facilitate bi-directional communications.

First RFI 109 is configured to carry the first signal S1 between the first device 101 and the second device 103. Second RFI 111 is configured to carry the second signal S2 between the first device 101 and the third device 105. Third RFI 113 is configured to carry the third signal S3 between the first device 101 and the fourth device 109.

Each of the transceivers (e.g., transceivers 109a, 109b 111a, 111b, 113a or 113b) of the first RFI 109, the second RFI 111 and the third RFI 113 comprise one or more carrier generators (not shown). The transceivers 109a, 109b 111a, 111b, 113a or 113b of the first RFI 109, the second RFI 111 and the third RFI 113, if operating as a transmission device, are configured to modulate data to be transmitted to one of the first device 101, the second device 103, the third device 105 or the fourth device 107 based on carrier signals generated by the one or more carrier generators. The transceivers 109a, 109b 111a, 111b, 113a or 113b of the first RFI 109, the second RFI 111 and the third RFI 113, if operating as a receiving device, are configured to demodulate a received first signal, a received second signal, or a received third signal based on carrier signals generated by the one or more carrier generators.

The first signal S1 is generated based on one or more carrier signals of a set of N carrier signals, where N is an integer greater than 1. The second signal S2 is generated based on one or more carrier signals of a first set of carrier signals. The third signal S3 is generated based on one or more carrier signals of a second set of carrier signals. The first set and the second set together form a set of M carrier signals, where M is an integer greater than 2. The first set or the second set of carrier signals includes at least one. In some embodiments, the sum of the first set and the second set of carrier signals is equal to the set of M carrier signals. The set of N carrier signals is equal to, greater than or equal to the set of M carrier signals. In some embodiments, the second set of carrier signals comprises at least one carrier signal different from a carrier signal included in the first set of carrier signals. In some embodiments, each of the carrier signals in the second set of carrier signals is different from each of the carrier signals included in the first set of carrier signals.

In some embodiments, a size of the first set of carrier signals, utilized to generate the second signal S2, is related to the data rate supported by the second RFI 111. In some embodiments, a size of the second set of carrier signals, utilized to generate the third signal S3, is related to the data rate supported by the third RFI 113.

In some embodiments, based on the data rate (e.g., data rate D1, D2 or D3) associated with the second device (e.g., second device 103), the third device (e.g., third device 105), or the fourth device (e.g., fourth device 107), a transceiver (e.g., transceiver 109a, 109b, 111a, 111b, 113a or 113b) of the one or more transceivers (e.g., transceiver 109a, 109b, 111a, 111b, 113a or 113b) is configured to select a quantity of carriers to use for modulating data to generate the first signal (e.g., first signal S1), the second signal (e.g., second signal S2) or the third signal (e.g., third signal S3). For example, as a data rate or bandwidth associated with a device (e.g., second device 103, third device 105, or fourth device 107) of the integrated circuit (e.g., integrated circuit 100) increases, the quantity of carrier signals used to modulate the data to be transmitted increases. In some embodiments, first device 101 or second device 103 is configured to generate the first data signal S1 based on a selected quantity of carrier signals of the one or more carrier signals included in the third set of carrier signals. In some embodiments, the selected quantity of carrier signals is based on the first data rate D1 supported by the first RFI 109.

In some embodiments, first RFI 109 is configured to identify an output signal generated by the first device 101 or second device 103, as being the first signal S1 based, at least in part, on the first data rate D1 associated with the second device 103. In some embodiments, second RFI 111 is configured to identify an output signal generated by the first device 101 or third device 105, as being the second signal S2 based, at least in part, on the second data rate D2 associated with the third device 105. In some embodiments, third RFI 113 is configured to identify an output signal generated by the first device 101 or fourth device 107, as being the third signal S3 based, at least in part, on the third data rate D3 associated with the fourth device 107.

In some embodiments, one or more of the first RFI 109, the second RFI 111 or the third RFI 113 are configured to communicate the corresponding first signal S1, the second signal S2, or the third signal S3 based on frequency-division duplexing (FDD). In some embodiments, the second RFI 111 and the third RFI 113 are configured to share second channel 115 based on FDD. In some embodiments, the second RFI 111 is configured to communicate the second signal S2 between the first device 101 and the third device 105, and the third RFI 113 is configured to communicate the third data S3 signal between the first device 101 and the fourth device 107 based on FDD.

In some embodiments, where the second RFI 111 and the third RFI 113 are configured to share second channel 115 based on FDD, a fundamental frequency of the second signal S2 is not equal to a fundamental frequency of the third signal S3. In some embodiments, FDD allows for bi-directional communication through one or more of the first RFI 109, the second RFI 111 or the third RFI 113.

In some embodiments, the transceivers 111a, 111b of the second RFI 111 or the transceivers 113a, 113b of the third RFI 113 are configured to distinguish between the second signal S2 and the third signal S3 transmitted through second channel 115 based on a fundamental frequency of the second signal S2 and the third signal S3. In some embodiments, for example, the second RFI 111 and the third RFI 113 are configured to distinguish between the second signal S2 and the third signal S3 communicated through second channel 115 based on a frequency of the second signal S2 and a frequency of the third signal S3. The frequency of the second signal S2 is based on at least one of the carrier signals of the first set of carrier signals, and the frequency of the third signal S3 is based on at least one of the carrier signals of the second set of carrier signals.

In some embodiments, one or more of the first RFI 109, the second RFI 111 or the third RFI 113 is configured to cause the first signal S1, the second signal S2 or the third signal S3 to be communicated from a transmitting device to an intended receiving device based on the frequency of the data signal. In some embodiments, for example, the second RFI 111 is configured to cause the second signal S2 to be communicated between the first device 101 and the third device 105 based on the frequency of the second signal S2, and the third RFI 113 is configured to cause the third signal S3 to be communicated between the first device 101 and the fourth device 107 based on the frequency of the third signal S3.

In some embodiments, second RFI 111 and third RFI 113 are configured to share second channel 115 based on time-division duplexing (TDD). In some embodiments, where the second RFI 111 and the third RFI 113 are configured to share second channel 115 based on TDD, a time of transmission of the second signal S2 is not equal to a time of transmission of the third signal S3. In some embodiments, the transceivers 109a, 109b of first RFI 111 are configured to share second channel 115 based on TDD.

In some embodiments, to facilitate the transmission of a data signal based on TDD such that an intended receiving device receives the transmitted data signal, one or more of the first RFI 109, the second RFI 111 or the third RFI 113 comprise switches. In some embodiments, for example, the second RFI 111 and the third RFI 113 comprise a plurality of switches configured to selectively cause the second signal S2 to be communicated between the first device 101 and the third device 105 over second channel 115, or to selectively cause the third signal S3 to be communicated between the first device 101 and the fourth device 107 over second channel 115.

Figure 4:
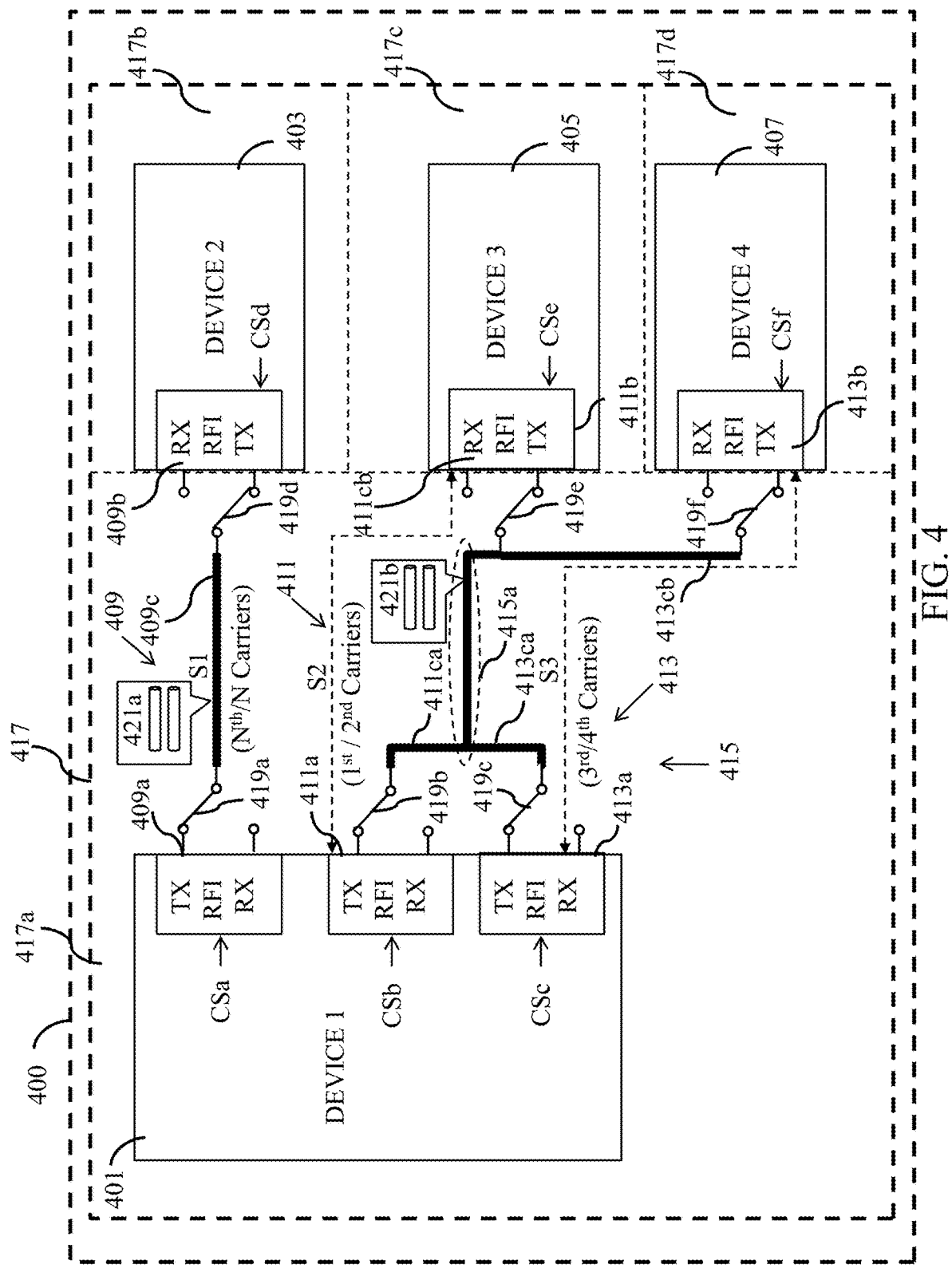
FIG. 4 is a block diagram of an integrated circuit having a radio frequency interconnect, in accordance with one or more embodiments.

In some embodiments, the switches (shown in FIG. 4) are controlled by way of a control signal (shown in FIG. 4). In some embodiments, for example, the second RFI 111 and the third RFI 113 are configured to control the switches of the plurality of switches based on a control signal associated with a timing of communicating the second signal S2 or the third signal S3. In some embodiments, TDD makes it possible to coordinate a direction of communication through the second channel 115.

In some embodiments, the second channel 115 shared by the second RFI 111 and the third RFI 113 comprises a first unidirectional coupler configured to facilitate a transmission from the first device 101 to the third device 105 and from the first device 101 to the fourth device 107, and a second unidirectional coupler configured to facilitate a transmission from the third device 105 to the first device 101 and from the fourth device 107 to the first device 101.

In some embodiments, the first RFI 109, the second RFI 111 and the third RFI 113 are configured to communicate the first signal S1 between the first device 101 and the second device 103, to communicate the second signal S2 between the first device 101 and the third device 105, or to communicate the third signal S3 between the first device 101 and the fourth device 107 based on a handshake. In some embodiments, the handshake is utilized to identify a transmitting transceiver (e.g., transceiver 109a, 109b, 111a, 111b, 113a or 113b) of one of the first device 101, the second device 103, the third device 105 or the fourth device 107, and identify a receiving transceiver as a different one of the first device 101, the second device 103, the third device 105 or the fourth device 107.

In some embodiments, second channel 115 comprises a plurality of junctions configured to direct the second signal S2 or the third signal S3 to an intended receiver of the first device 101, the third device 105, or the fourth device 107 based, at least in part, on the frequency of the second signal S2, or the frequency of the third signal S3. In some embodiments, first channel 109 comprises a plurality of junctions configured to direct the first signal S1 to an intended receiver of the first device 101 based, at least in part, on the frequency of the first signal S1.

In some embodiments, the second channel 115 is divided into two channels (e.g., a first separate channel and a second separate channel) such that the second RFI 111 and the third RFI 113 do not share a common channel (e.g., second channel 115). In these embodiments, the second RFI 111 includes the first separate channel and the third RFI 113 includes the second separate channel. In these embodiments, the second RFI 111 or the third RFI 113 is configured in a manner similar to that of the first RFI 109. In these embodiments, the transceivers of the first RFI 109, the second RFI 111 or the third RFI 113 are configured in a manner to support FDD or TDD.

Figure 2:
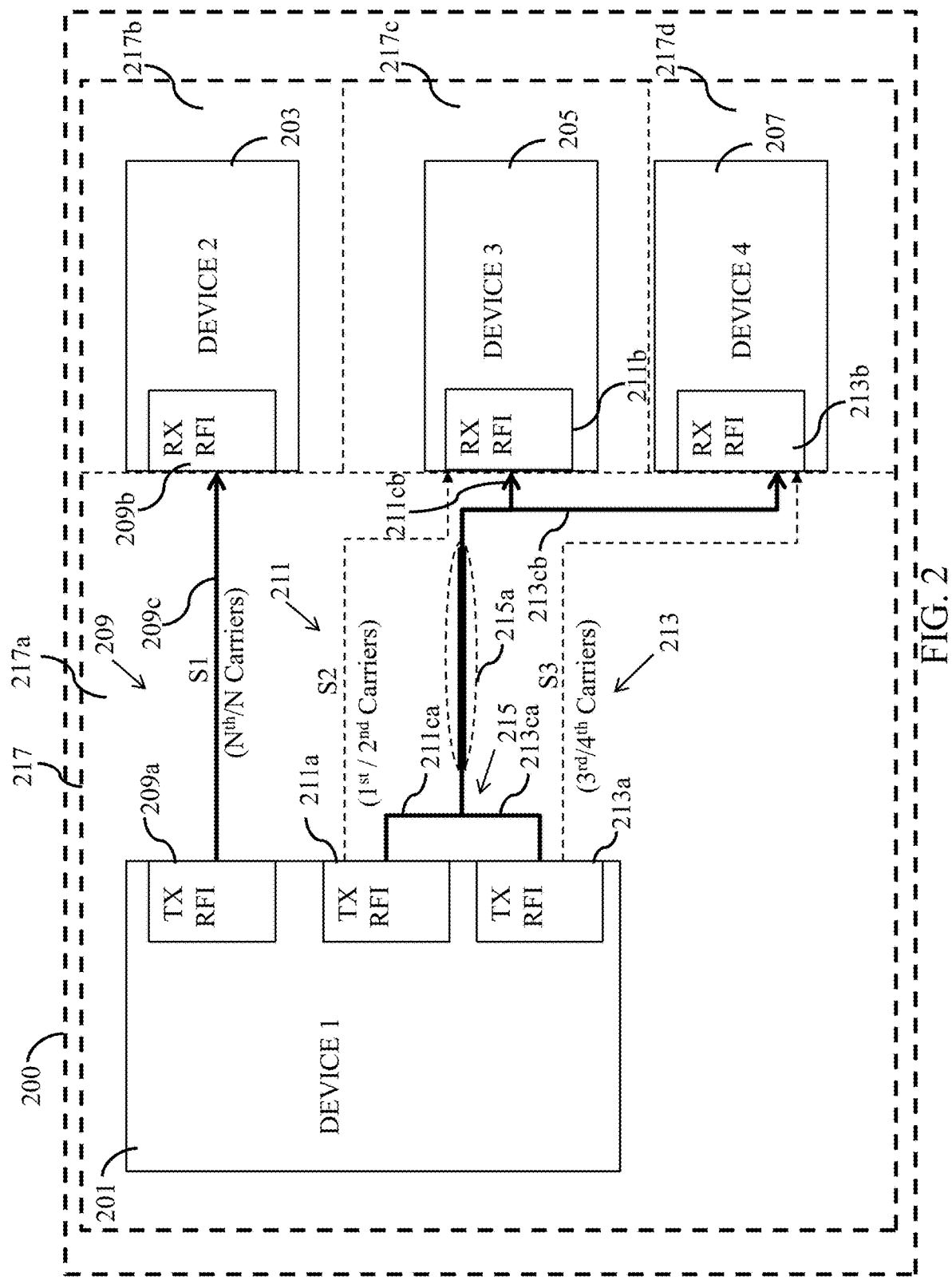
FIG. 2 is a block diagram of an integrated circuit having a radio frequency interconnect, in accordance with one or more embodiments.

FIG. 2 is a block diagram of an integrated circuit 200 having an RFI, in accordance with one or more embodiments. Integrated circuit 200 comprises features similar to the features discussed with respect to integrated circuit 100 (FIG. 1), with the reference numerals increased by 100.

Integrated circuit 200 differs from integrated circuit 100 in that the first RFI 209, the second RFI 211 and the third RFI 213 are configured to facilitate uni-directional communications. As such, first RFI 209 includes a first transmitter 209a, a first receiver 209b and a first channel 209c, second RFI 211 includes a second transmitter 211a, a second receiver 211b and a second channel 215, and third RFI 213 includes a third receiver 213a, a third receiver 213b and a second channel 215.

Because at least the second RFI 211 and the third RFI 213 share second channel 215, integrated circuit 200 is capable of physically occupying a smaller amount of space than if integrated circuit 200 included an entirely separate channel for each individual RFI included therein.

First transmitter 209a is configured to transmit first signal S1 to first receiver 209b by channel 209. Second transmitter 211a is configured to transmit second signal S2 to second receiver 211b by second channel 215. Third transmitter 213a is configured to transmit third signal S3 to third receiver 213b by second channel 215.

Figure 3:
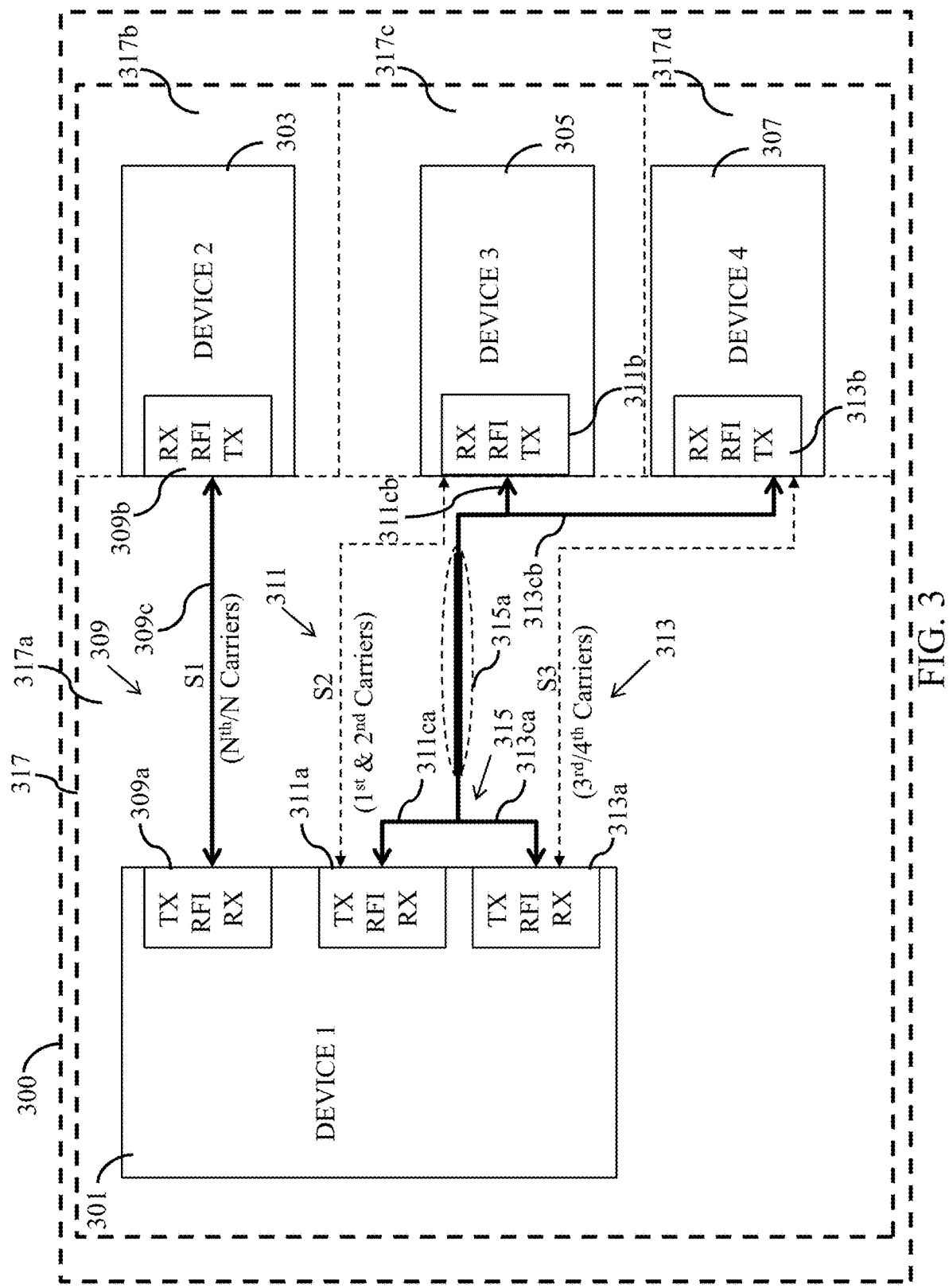
FIG. 3 is a block diagram of an integrated circuit having a radio frequency interconnect, in accordance with one or more embodiments.

FIG. 3 is a block diagram of an integrated circuit 300 having an RFI, in accordance with one or more embodiments. Integrated circuit 300 comprises features similar to the features discussed with respect to integrated circuit 100 (FIG. 1), with the reference numerals increased by 200. In integrated circuit 300, the first RFI 309, the second RFI 311 and the third RFI 313 are configured to facilitate bi-directional communications.

Because at least the second RFI 311 and the third RFI 313 share second channel 315, integrated circuit 300 is capable of physically occupying a smaller amount of space than if integrated circuit 300 included an entirely separate channel for each individual RFI included therein.

FIG. 4 is a block diagram of an integrated circuit 400 having an RFI, in accordance with one or more embodiments. Integrated circuit 400 comprises features similar to the features discussed with respect to integrated circuit 100 (FIG. 1), with the reference numerals increased by 300. Integrated circuit 400 differs from integrated circuit 100 in that the first RFI 409, the second RFI 411 and the third RFI 413 comprise switches 419a-419f.

Switches 419a-419b are configured to be selectively controlled based on a corresponding control signal CSa, CSb to coordinate the transmission of the first signal S1 through first channel 409c based on TDD. Switches 419c-419f are configured to be selectively controlled based on a corresponding control signal CSc, CSd, CSe, CSf to coordinate the transmission of second signal S2 through second channel 415, and the transmission of third signal S3 through second channel 415 based on TDD. In some embodiments, TDD makes it possible to coordinate a direction of communication through the first channel 409c and the second channel 415.

First channel 409c is a first differential transmission line 421a and second channel 415 is a second differential transmission line 421b. In some embodiments, first channel 409c or second channel 415 is a waveguide. In some embodiments, first channel 409c or second channel 415 is a single-ended transmission line.

Because at least the second RFI 411 and the third RFI 413 share second channel 415, integrated circuit 400 is capable of physically occupying a smaller amount of space than if integrated circuit 400 included an entirely separate channel for each individual RFI included therein.

In some embodiments, the second channel 415 is divided into two channels (e.g., a first separate channel and a second separate channel) such that the second RFI 411 and the third RFI 413 do not share a common channel (e.g., second channel 415). In these embodiments, the second RFI 411 includes the first separate channel and the third RFI 413 includes the second separate channel. In these embodiments, the second RFI 411 or the third RFI 413 is configured in a manner similar to that of the first RFI 409 (as described above).

Figure 5:
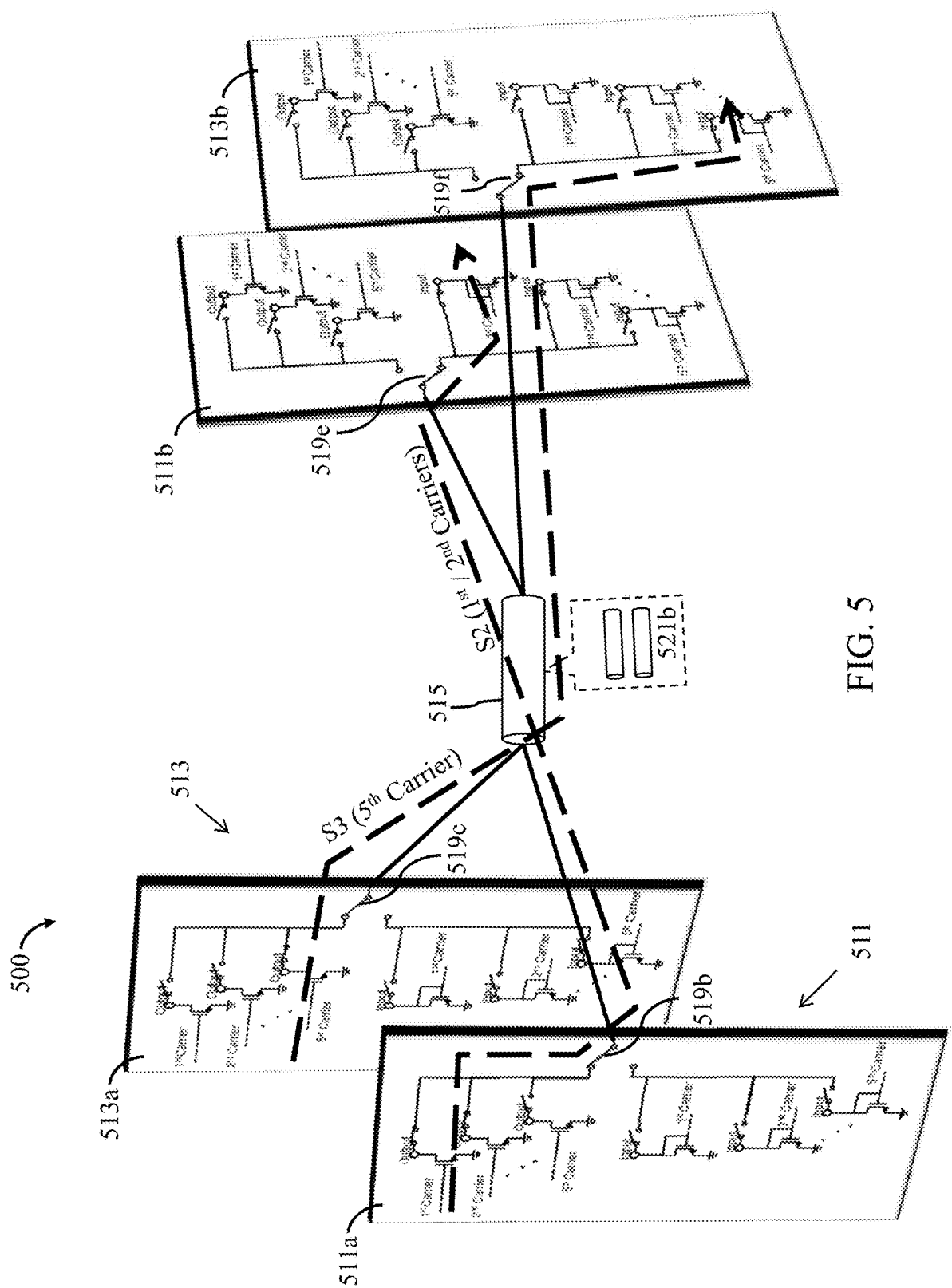
FIG. 5 is a block diagram of an integrated circuit having a radio frequency interconnect, in accordance with one or more embodiments.

FIG. 5 is a diagram of an integrated circuit 500 having an RFI, in accordance with one or more embodiments. Integrated circuit 500 comprises features similar to the features discussed with respect to integrated circuit 400 (FIG. 4), with the reference numerals increased by 100. Integrated circuit 500 differs from integrated circuit 400 in that the first RFI 409 is not included.

Transceiver 511a is configured to transmit second signal S2 to transceiver 511b of second RFI 511. Transceiver 513a is configured to transmit third signal S3 to transceiver 513b of third RFI 513. In this embodiment, second signal S2 is generated based on a first carrier signal and a second carrier signal. In this embodiment, third signal S3 is generated based on a fifth carrier signal.

Switches 519b-519c and 519e-519f are configured to be selectively controlled based on a control signal (shown in FIG. 4) to coordinate the transmission of second signal S2 and third signal S3 through second channel 515 based on TDD. Switches 519b and 519e are closed to couple a transmitter portion of transceiver 511a with a receiver portion of transceiver 511b. Switches 519c and 519f are closed to couple a transmitter portion of transceiver 513a with a receiver portion of transceiver 513b.

Second channel 515 is a differential transmission line 521b. In some embodiments, second channel 515 is a waveguide or a single-ended transmission line.

Figure 6:
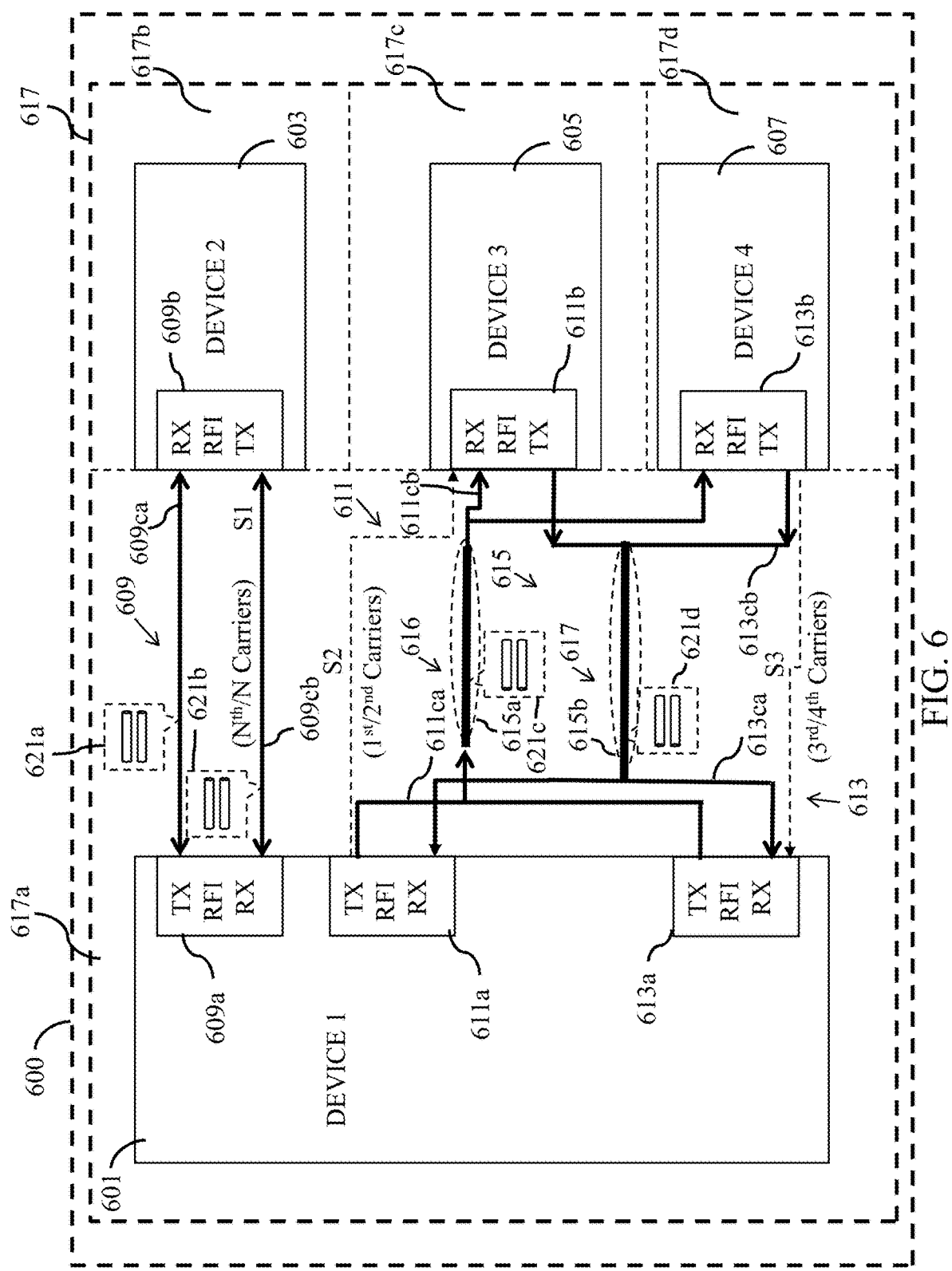
FIG. 6 is a block diagram of an integrated circuit having a radio frequency interconnect, in accordance with one or more embodiments.

FIG. 6 is a block diagram of an integrated circuit 600 having an RFI, in accordance with one or more embodiments. Integrated circuit 600 comprises features similar to the features discussed with respect to integrated circuit 300 (FIG. 3), with the reference numerals increased by 300.

In integrated circuit 600, the first RFI 609 comprises channels 609ca and 609cb. Channel 609ca communicatively couples a transmitter portion of transceiver 609a with a receiver portion of transceiver 609b. Channel 609cb communicatively couples a receiver portion of transceiver 609a with a transmitter portion of transceiver 609b. Channel 609ca is a first differential transmission line 621a and channel 609cb is a second differential transmission line 621b. In some embodiments, channel 609ca or channel 609cb is a waveguide. In some embodiments, channel 609ca or channel 609cb is a single-ended transmission line.

In integrated circuit 600, the second channel 615 is divided into two uni-directional channels (e.g., first uni-directional channel 616 and second uni-directional channel 617.

First uni-directional channel 616 communicatively couples transmitter portions of transceiver 611a and transceiver 613a with receiver portions of transceiver 611b and transceiver 613b. First uni-directional channel 616 comprises a first shared channel portion 615a and first channel portion 611ca/611cb (collectively referred to herein as channel portion 611c).

Second uni-directional channel 617 communicatively couples transmitter portions of the transceiver 611b and the transceiver 613b with receiver portions of the transceiver 611a and the transceiver 613a. Second uni-directional channel 617 comprises a second shared channel portion 615b and a second channel portion 613ca/613cb (collectively referred to herein as channel portion 613c).

The first RFI 609, the second RFI 611 and the third RFI 613 are configured to communicate the first signal S1, the second signal S2 and the third signal S3 using FDD. First uni-directional channel 616 is a third differential transmission line 621c and second uni-directional channel 617 is a fourth differential transmission line 621d. In some embodiments, first uni-directional channel 616 or second uni-directional channel 617 is a waveguide. In some embodiments, first uni-directional channel 616 or second uni-directional channel 617 is a single-ended transmission line.

Because at least the second RFI 611 and the third RFI 613 share channels 615a and 615b, integrated circuit 600 is capable of physically occupying a smaller amount of space than if integrated circuit 600 included an entirely separate transmission channel for each individual RFI included therein.

Figure 7:
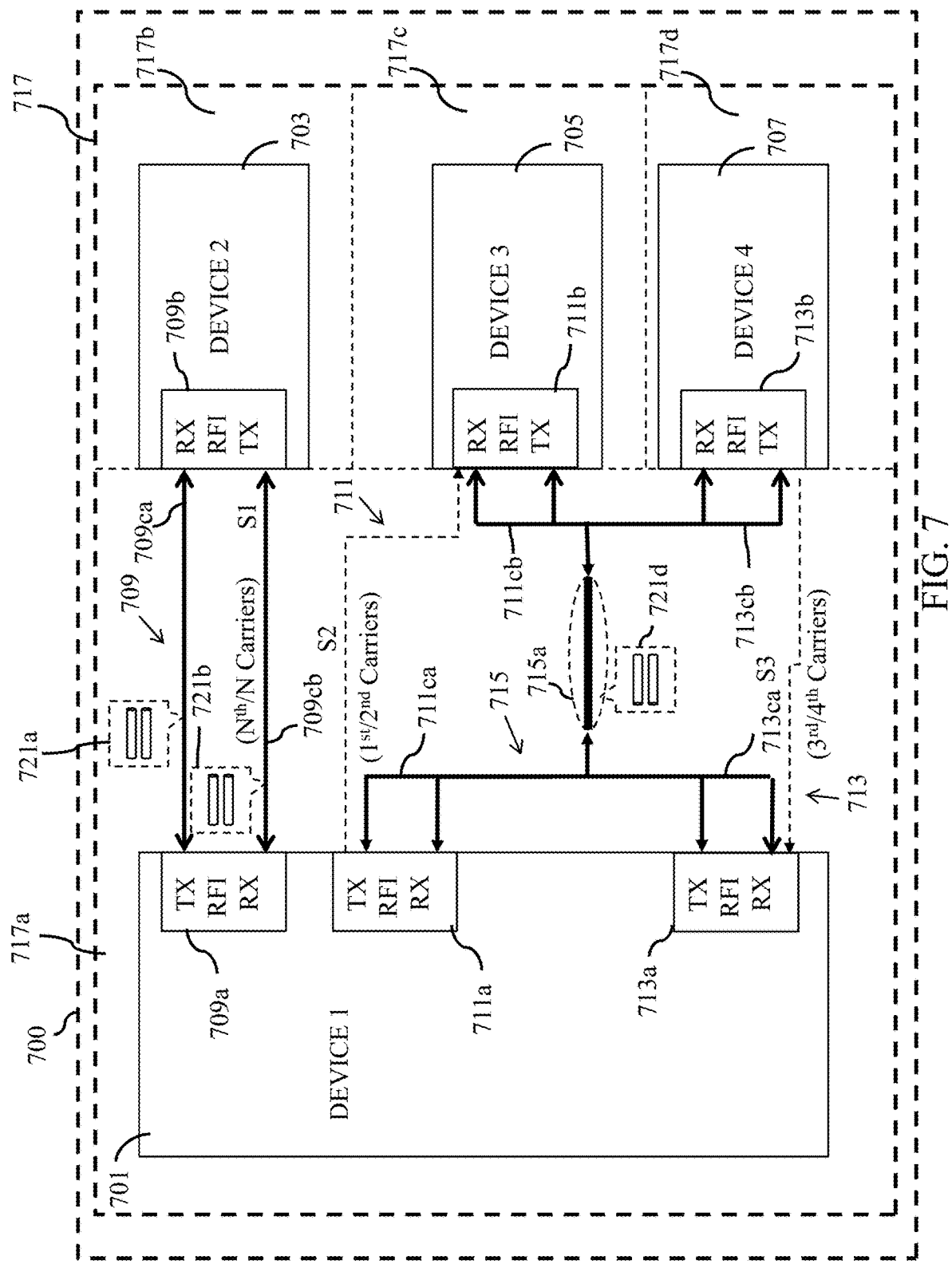
FIG. 7 is a block diagram of an integrated circuit having a radio frequency interconnect, in accordance with one or more embodiments.

FIG. 7 is a block diagram of an integrated circuit 700 having an RFI, in accordance with one or more embodiments. Integrated circuit 700 comprises features similar to the features discussed with respect to integrated circuit 600 (FIG. 6), with the reference numerals increased by 100. Integrated circuit 700 differs from integrated circuit 600 in that the second RFI 711 and the third RFI 713 are configured to facilitate bi-directional communication through a shared channel 715. Integrated circuit 700 is capable of saving even more space than integrated circuit 600, at least because integrated circuit 700 includes one shared channel instead of two.

Figure 8:
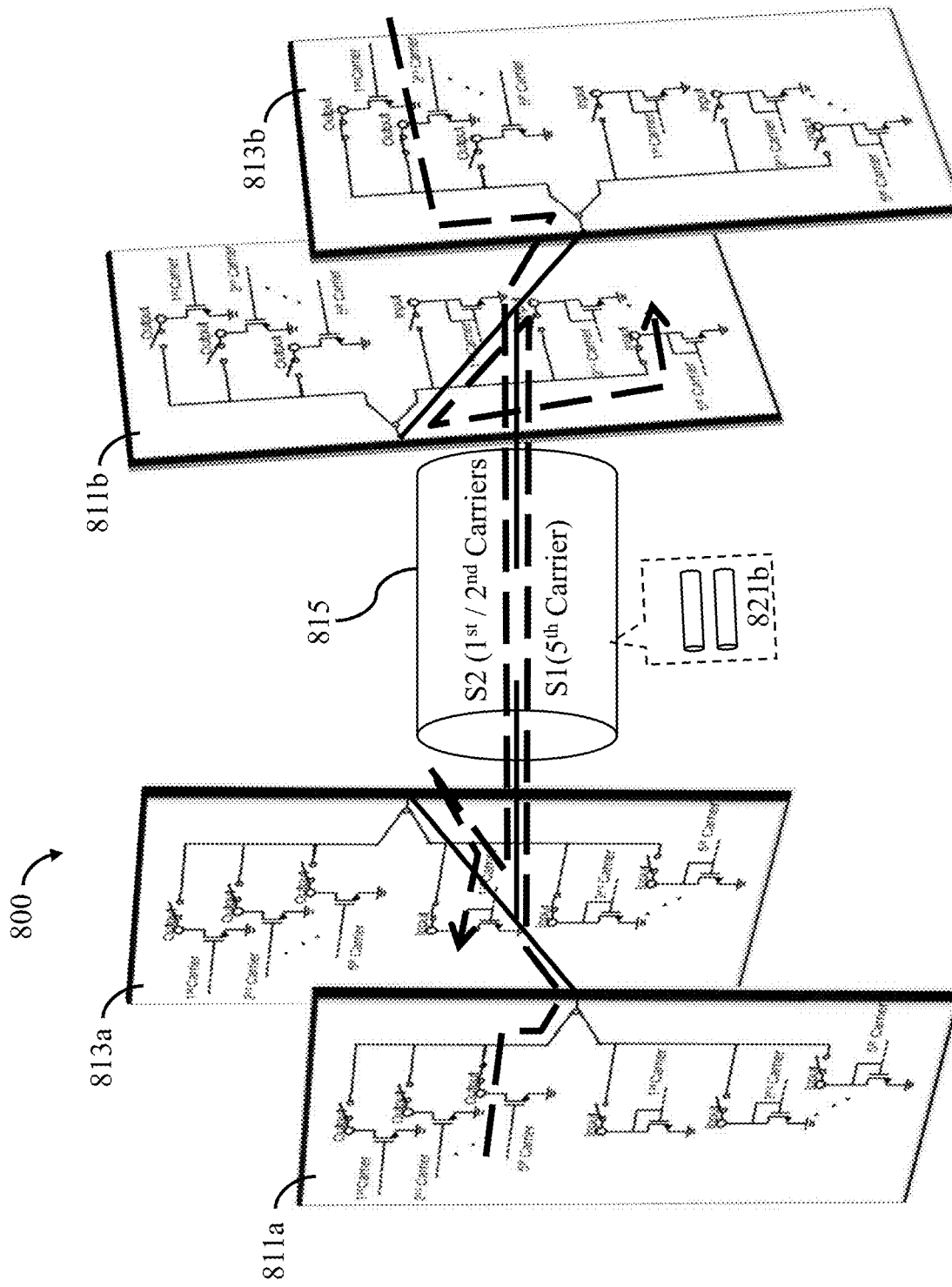
FIG. 8 is a block diagram of an integrated circuit having a radio frequency interconnect, in accordance with one or more embodiments.

FIG. 8 is a diagram of an integrated circuit 800 having a radio frequency interconnect, in accordance with one or more embodiments. Integrated circuit 800 comprises features similar to integrated circuit 500 (FIG. 5), with the reference numerals increased by 300). Integrated circuit 800 differs from integrated circuit 500 in that first RFI 809, second RFI 811 and third RFI 813 are configured to simultaneously send/receive first signal S1 or second signal S2 through shared channel 815 by FDD.

As such, integrated circuit 809 does not utilize switches 519a-519f (FIG. 5). In this example, transceiver 811a is configured to transmit second signal S2 to transceiver 811b over shared channel 815, and transceiver 813b is configured to transmit third signal S3 to transceiver 813a over shared channel 815.

Figure 9:
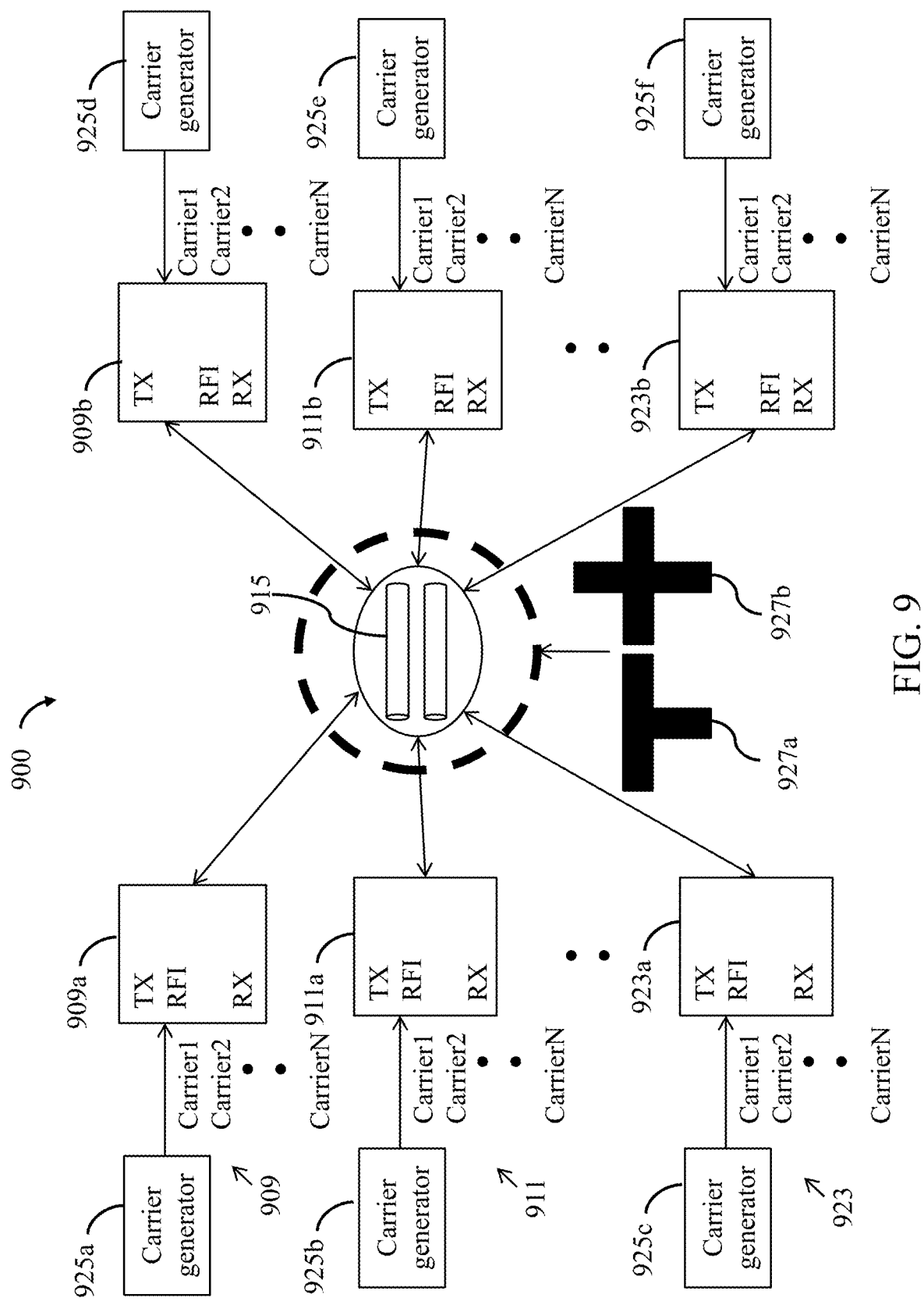
FIG. 9 is a block diagram of an integrated circuit having a radio frequency interconnect, in accordance with one or more embodiments.

FIG. 9 is a block diagram of an integrated circuit 900 having an RFI, in accordance with one or more embodiments. Integrated circuit 900 comprises features similar to integrated circuit 100 (FIG. 1), with the reference numerals increased by 800.

Integrated circuit 900 includes first RFI 909 having transceivers 909a and 909b, second RFI 911 having transceivers 911a and 911b, and additional RFI's 923 having transceivers 923a and 923b. Additional RFI's 923 provide for a total quantity of X RFI's, where X is an integer greater than 1. Integrated circuit 900 is capable of having a greater quantity or a lesser quantity of devices in comparison to the number of RFI devices included in integrated circuit 900. Each of the RFI's is configured to share channel 915. In some embodiments, channel 915 is a differential transmission line. In some embodiments, channel 915 is a single-ended transmission line or a waveguide. Each of the transceivers 909a, 909b, 911a, 911b, 923a, 923b comprise or have connectivity to corresponding carrier generators 925a-925f that are configured to generate the carrier signals upon which data signals such as first signal S1, second signal S2 and third signal S3 are generated.

In some embodiments, each of the RFI's 909, 911 and 923 is configured to share channel 915 based on FDD. In these embodiments, the carrier generator for each RFI is configured to generate a different carrier frequency from each other.

In some embodiments, to facilitate the communication of data signals from a transmitter to an intended receiver of integrated circuit 900, channel 915 comprises one or more T-junction transmission lines 927a, one or more cross-junction transmission lines 927b, one or more other suitable junction types, or a combination thereof.

In some embodiments, to facilitate the communication of data signals from a transmitter to an intended receiver of integrated circuit 900, at least one device associated with the RFI's, or at least one of the transceivers 909a, 909b, 911a, 911b, 923a or 923b is configured to identify a transmitting device and identify a receiving device based on a handshake.

Because the first RFI 109, the second RFI 111 and the third RFI 513 share channel 915, integrated circuit 900 is capable of physically occupying a smaller amount of space than if integrated circuit 900 included an entirely separate channel for each individual RFI included therein.

Figure 10:
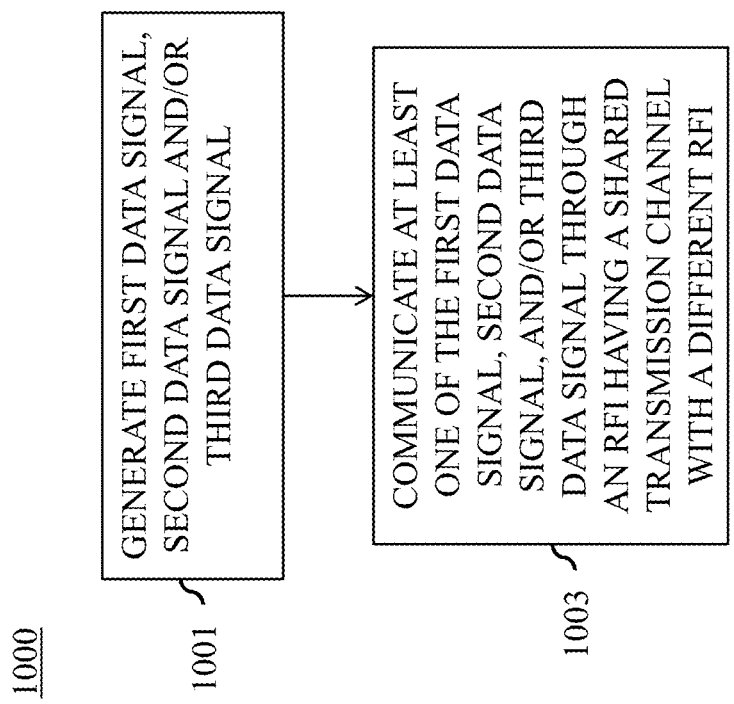
FIG. 10 is a method of communicating in an integrated circuit having a radio frequency interconnect, in accordance with one or more embodiments.

FIG. 10 is a method 1000 of communicating in an integrated circuit having an RFI, in accordance with one or more embodiments. Method 1000 is performed by way of an integrated circuit such as integrated circuit 100 (FIG. 1).

In step 1001, one or more transceivers (e.g., transceivers 109a, 109b, 111a, 111b, 113a, 113b (FIG. 1)) generate one or more of a first signal (e.g., first signal S1), a second signal (e.g., second signal S2) or a third signal (e.g., third signal S3) to be communicated between a first device (e.g., first device 101) and a second device (e.g., second device 103), the first device (e.g., first device 101) and a third device (e.g., third device 105), or the first device (e.g., first device 101) and a fourth device (e.g., fourth device 107), respectively.

The generated first signal (e.g., first signal S1) has a first data rate (e.g., D1), the second signal (e.g., second signal S2) has a second date rate (e.g., D2) or the third signal (e.g., third signal S3) has a third data rate (e.g., D3). The first data rate (e.g., D1), the second date rate (e.g., D2) or the third data rate (e.g., D3) are associated with the corresponding second device (e.g., second device 103), the third device (e.g., third device 105), or the fourth device (e.g., fourth device 107). The first RFI (e.g., first RFI 109) is configured to support a first data rate (e.g., D1), the second RFI (e.g., second RFI 111) is configured to support a second data rate (e.g., D2), and the third RFI (e.g., third RFI 113) is configured to support a third data rate (e.g., D3). The first data rate (e.g., D1) being greater than the second data rate (e.g., D2) or the third data rate (e.g., D3), and the second data rate (e.g., D2) being greater than the third data rate (e.g., D3).

The second signal (e.g., second signal S2) is generated based on one or more carrier signals of a first set of carrier signals, and the third signal (e.g., second signal S3) is generated based on one or more carrier signals of a second set of carrier signals comprising at least one carrier signal different from a carrier signal included in the first set of carrier signals. The first signal (e.g., first signal S1) is generated based on one or more carrier signals of a third set of carrier signals comprising at least one carrier signal different from a carrier signal included in the first set of carrier signals and the second set of carrier signals.

In some embodiments, based on the data rate (e.g., data rate D1, D2 or D3) associated with the second device (e.g., second device 103), the third device (e.g., third device 105), or the fourth device (e.g., fourth device 107), a transceiver (e.g., transceiver 109a, 109b, 111a, 111b, 113a or 113b) of the one or more transceivers (e.g., transceiver 109a, 109b, 111a, 111b, 113a or 113b) is configured to select a quantity of carriers to use for modulating data to generate the first signal (e.g., first signal S1), the second signal (e.g., second signal S2) or the third signal (e.g., third signal S3). For example, as a data rate or bandwidth associated with a device (e.g., second device 103, third device 105, or fourth device 107) of the integrated circuit (e.g., integrated circuit 100) increases, the quantity of carrier signals used to modulate the data to be transmitted increases.

In step 1003, the first signal (e.g., first signal S1) is communicated between the first device (e.g., first device 101) and the second device (e.g., second device 103) by way of a first RFI (e.g., first RFI 109) configured to carry the first signal (e.g., first signal S1) between the first device (e.g., first device 101) and the second device (e.g., second device 103), the second signal (e.g., second signal S2) communicated between the first device (e.g., first device 101) and the third device (e.g., third device 105) by way of a second RFI (e.g., second RFI 111) configured to carry the second signal (e.g., second signal S2) between the first device (e.g., first device 101) and the third device (e.g., third device 105), or the third signal (e.g., third signal S3) is communicated between the first device (e.g., first device 101) and the fourth device (e.g., fourth device 107) by way of a third RFI (e.g., third RFI 113) configured to carry the third signal (e.g., third signal S3) between the first device (e.g., first device 101) and the fourth device (e.g., fourth device 107). At least the second RFI (e.g., second RFI 111) and the third RFI (e.g., third RFI 113) share a channel (e.g., second channel 115) based on FDD or TDD.

In some embodiments, at least one of the devices of the integrated circuit (e.g., integrated circuit 100) causes the first signal (e.g., first signal S1) to be communicated between the first device (e.g., first device 101) and the second device (e.g., second device 103), the second signal (e.g., second signal S2) to be communicated between the first device (e.g., first device 101) and the third device (e.g., third device 105), or the third signal (e.g., third signal S3) to be communicated between the first device (e.g., first device 101) and the fourth device (e.g., fourth device 107) by selectively controlling a combination of switches of a plurality of switches (e.g., 419a-419f (FIG. 4)) included in the first RFI (e.g., first RFI 109 (FIG. 1)), the second RFI (e.g., second RFI 111) and the third RFI (e.g., third RFI 113) based on a control signal (e.g., control signal CSa, CSb, CSc, CSd, CSe, CSf or CSg). In some embodiments, the control signal (e.g., control signal CSa, CSb, CSc, CSd, CSe, CSf or CSg) is communicated from a transmitting device to a receiving device to coordinate reception of the transmitted data signal. In some embodiments, the channel (e.g., channel 915 (FIG. 9)) is further shared by the first RFI.

In some embodiments, at least one device of the integrated circuit issues a handshake to cause the first RFI, the second RFI or the third RFI to communicate the first signal between the first device and the second device, to communicate the second signal between the first device and the third device, or to communicate the third signal between the first device and the fourth device by way of the shared channel. In some embodiments, the handshake comprises information identifying a transmitting device as one of the first device, the second device, the third device or the fourth device, and identifying a receiving device as a different one of the first device, the second device, the third device or the fourth device.

In some embodiments, an integrated circuit includes a first device positioned over a substrate, the first device including first through third transceivers, a second device positioned over the substrate, the second device including a fourth transceiver, a third device positioned over the substrate, the third device including a fifth transceiver, and a fourth device positioned over the substrate, the fourth device including a sixth transceiver. A first RFI includes the first transceiver coupled to the fourth transceiver through a first guided transmission medium, a second RFI includes the second transceiver coupled to the fifth transceiver through a second guided transmission medium, and a third RFI includes the third transceiver coupled to the sixth transceiver by the second guided transmission medium.

In some embodiments, an integrated circuit includes a first device positioned over a substrate, the first device including first through third transmitters, a second device positioned over the substrate, the second device including a first receiver, a third device positioned over the substrate, the third device including a second receiver, and a fourth device positioned over the substrate, the fourth device including a third receiver. A first RFI includes the first transmitter coupled to the first receiver through a first guided transmission medium, a second RFI includes the second transmitter coupled to the second receiver through a second guided transmission medium, and a third RFI includes the third transmitter coupled to the third receiver by the second guided transmission medium.

In some embodiments, a method includes generating one or more of a first data signal, a second data signal or a third data signal to be communicated between a first device and a second device, the first device and a third device, or the first device and a fourth device, respectively, communicating the first data signal between the first device and the second device by way of a first RFI including a first channel and configured to carry the first data signal between the first device and the second device, and communicating one or more of the second data signal between the first device and the third device by way of a second RFI comprising a second channel and configured to carry the second data signal between the first device and the third device, or the third data signal between the first device and the fourth device by way of a third RFI comprising the second channel and configured to carry the third data signal between the first device and the fourth device. Communicating the one or more of the second data signal or the third data signal includes distinguishing between the second and third data signals based on a frequency of the second data signal and a frequency of the third data signal, or communicating a control signal to coordinate the communicating the one or more of the second data signal or the third data signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
a first device positioned over a substrate, the first device comprising first through third transceivers;
a second device positioned over the substrate, the second device comprising a fourth transceiver;
a third device positioned over the substrate, the third device comprising a fifth transceiver; and
a fourth device positioned over the substrate, the fourth device comprising a sixth transceiver,
wherein
a first radio frequency interconnect (RFI) comprises the first transceiver coupled to the fourth transceiver through a first guided transmission medium,
a second RFI comprises the second transceiver coupled to the fifth transceiver through a second guided transmission medium, [[and]]
a third RFI comprises the third transceiver coupled to the sixth transceiver by the second guided transmission medium, and
each of the second transceiver and the third transceiver is coupled to each of the fifth transceiver and the sixth transceiver by the second guided transmission medium.

2. The integrated circuit of claim 1, wherein the second guided transmission medium comprises:
a first unidirectional coupler configured to facilitate a transmission from the first device to the third device and from the first device to the fourth device; and
a second unidirectional coupler configured to facilitate a transmission from the third device to the first device and from the fourth device to the first device.

3. The integrated circuit of claim 1, wherein
each of the first transceiver and the fourth transceiver is configured to generate a first data signal based on a first number of carrier signals,
each of the second transceiver and the fifth transceiver is configured to generate a second data signal based on a second number of carrier signals, and
each of the third transceiver and the sixth transceiver is configured to generate a third data signal based on a third number of carrier signals.

4. The integrated circuit of claim 3, wherein
the first number of carrier signals is based on a data rate associated with the second device,
the second number of carrier signals is based on a data rate associated with the third device, and
the third number of carrier signals is based on a data rate associated with the fourth device.

5. The integrated circuit of claim 4, wherein the first number of carriers is greater than a sum of the second number of carriers and the third number of carriers.

6. The integrated circuit of claim 1, wherein
the second RFI comprises a first plurality of switches configured to selectively connect the second guided transmission medium to each of the second transceiver and the fifth transceiver, and
the third RFI comprises a second plurality of switches configured to selectively connect the second guided transmission medium to each of the third transceiver and the sixth transceiver.

7. The integrated circuit of claim 6, wherein the first plurality of switches and the second plurality of switches are configured to be selectively controlled based on a corresponding plurality of control signals to coordinate signal transmission through the second guided transmission medium based on time-division duplexing (TDD).

8. The integrated circuit of claim 1, wherein at least one of
the second RFI is configured to identify an output signal generated by the first device or the third device based on a first data rate associated with the third device, or
the third RFI is configured to identify an output signal generated by the first device or the fourth device based on a second data rate associated with the fourth device.

9. The integrated circuit of claim 1, wherein
the first device comprises a processor, and
the second device comprises a memory device.

10. The integrated circuit of claim 9, wherein at least one of the third device or the fourth device comprises a wireless communication device.

11. An integrated circuit, comprising:
a first device positioned over a substrate, the first device comprising first through third transmitters;
a second device positioned over the substrate, the second device comprising a first receiver;
a third device positioned over the substrate, the third device comprising a second receiver; and
a fourth device positioned over the substrate, the fourth device comprising a third receiver,
wherein
a first radio frequency interconnect (RFI) comprises the first transmitter coupled to the first receiver through a first guided transmission medium,
a second RFI comprises the second transmitter coupled to the second receiver through a second guided transmission medium,
a third RFI comprises the third transmitter coupled to the third receiver by the second guided transmission medium, and
each of the second transmitter and the third transmitter is coupled to each of the second receiver and the third receiver by the second guided transmission medium.

12. The integrated circuit of claim 11, wherein
the first device comprises fourth through sixth receivers,
the second device comprises a fourth transmitter,
the third device comprises a fifth transmitter,
the fourth device comprises a sixth transmitter,
the first RFI comprises the fourth transmitter coupled to the fourth receiver through a third guided transmission medium,
the second RFI comprises the fifth transmitter coupled to the fifth receiver through a fourth guided transmission medium, and
the third RFI comprises the sixth transmitter coupled to the sixth receiver by the fourth guided transmission medium.

13. The integrated circuit of claim 12, wherein each of the first guided transmission medium, the second guided transmission medium, the third guided transmission medium, and the fourth guided transmission medium comprises a differential transmission line.

14. The integrated circuit of claim 11, wherein
the first device comprises a processor,
the second device comprises a memory device, and
at least one of the third device or the fourth device comprises a wireless communication device.

15. A method, comprising:
generating one or more of a first data signal, a second data signal or a third data signal to be communicated between a first device and a second device, the first device and a third device, or the first device and a fourth device, respectively;
communicating the first data signal between the first device and the second device by way of a first radio frequency interconnect (RFI) comprising a first channel and configured to carry the first data signal between the first device and the second device; and
communicating one or more of:
the second data signal between the first device and the third device by way of a second RFI comprising a second channel and configured to carry the second data signal between the first device and the third device, or
the third data signal between the first device and the fourth device by way of a third RFI comprising the second channel and configured to carry the third data signal between the first device and the fourth device,
wherein the communicating the one or more of the second data signal or the third data signal comprises:
distinguishing between the second and third data signals based on a frequency of the second data signal and a frequency of the third data signal, or
communicating a control signal to coordinate the communicating the one or more of the second data signal or the third data signal.

16. The method of claim 15, wherein the distinguishing between the second and third data signals based on a frequency of the second data signal and a frequency of the third data signal comprises:
the frequency of the second data signal being based on a first carrier signal of a first set of carrier signals; and
the frequency of the third data signal being based on a second carrier signal of a second set of carrier signals.

17. The method of claim 16, wherein the communicating the one or more of the second data signal or the third data signal comprises coordinating transmission of the second data signal and the third data signal through the second channel using frequency-division duplexing (FDD) based on the first set of carrier signals and the second set of carrier signals.

18. The method of claim 15, wherein the communicating the control signal to coordinate the communicating the one or more of the second data signal or the third data signal comprises communicating a plurality of control signals to coordinate transmission of the second data signal and the third data signal through the second channel based on time-division duplexing (TDD).

19. The method of claim 18, wherein the communicating the plurality of control signals to coordinate the transmission of the second data signal and the third data signal through the second channel comprises coordinating a direction of the communicating the one or more of the second data signal or the third data signal through the second channel.

20. The method of claim 18, wherein the communicating the plurality of control signals to coordinate the transmission of the second data signal and the third data signal through the second channel comprises selectively controlling a plurality of switches included in the second RFI and the third RFI.

* * * * *